Patented July 3, 1928.

1,676,151

UNITED STATES PATENT OFFICE.

RALPH H. McKEE, OF NEW YORK, N. Y.

FILTERING MATERIAL AND PROCESS OF FILTERING.

No Drawing. Application filed September 16, 1924. Serial No. 738,106.

This invention relates to filtering materials and processes of filtering.

In the recovery of shale oil from oil shale, a great deal of difficulty is encountered in the disposal of the waste waters. These waste waters are contaminated with oil, basic materials, and acids, and are likely to prove nuisances if returned to rivers or other streams in this condition.

An object of the present invention is to provide an inexpensive method of removing impurities from the waste water and thus permit the water, in its purified state, to be returned to the stream without contaminating the river, or other stream, and permitting use of the water for various purposes, such as irrigation, steam raising, etc.

A further object of the invention is to employ the residue of oil shale from which shale oil has been removed, as a filtering medium.

The residue from oil shale distillation has decided adsorptive powers and by running the waste wash waters through a layer of such residue, the acids, bases, and oils will be removed, and substantially pure water will be obtained. In practicing the process, it is merely necessary to pass these waste waters through a shallow layer of the residue. The layer or bed should, however, be renewed from time to time.

Any suitable apparatus may be employed in practicing the process. The wash water employed in obtaining the shale oil may be delivered to a filter bed or similar apparatus in which the oil shale residue is arranged in a shallow layer and the water permitted to pass through the layer or bed of material. During its passage through the bed, the acids, bases, and oils are substantially all removed and relatively pure water obtained. When the filter bed has been employed for a length of time and has become fairly contaminated with the impurities from the water, the layer should be removed and replaced by a layer of fresh material.

While I have described in detail the preferred practice of my process, it is to be understood that the details of procedure may be widely varied without departing from the spirit of the invention or the scope of the subjoined claims.

I claim:

1. A material for use in purifying water consisting of the untreated residue obtained in the distillation of oil shale.

2. The process of purifying water which comprises passing the water to be purified through a body of untreated residue obtained from the distillation of oil shale.

3. The process of purifying water which comprises passing the water to be purified through a shallow layer of untreated residue obtained from the distillation of oil shale.

4. The process of removing oils, bases, and acids from wash water employed in the manufacture of shale oil from oil shale which comprises passing the water to be purified through a shallow layer of the untreated residue obtained in the distillation of said oil shale.

In testimony whereof, I affix my signature.

RALPH H. McKEE.